Aug. 10, 1937.　　　R. F. PEO ET AL　　　2,089,419
VALVING ASSEMBLY FOR HYDRAULIC SHOCK ABSORBERS
Filed Feb. 8, 1936　　　3 Sheets-Sheet 1
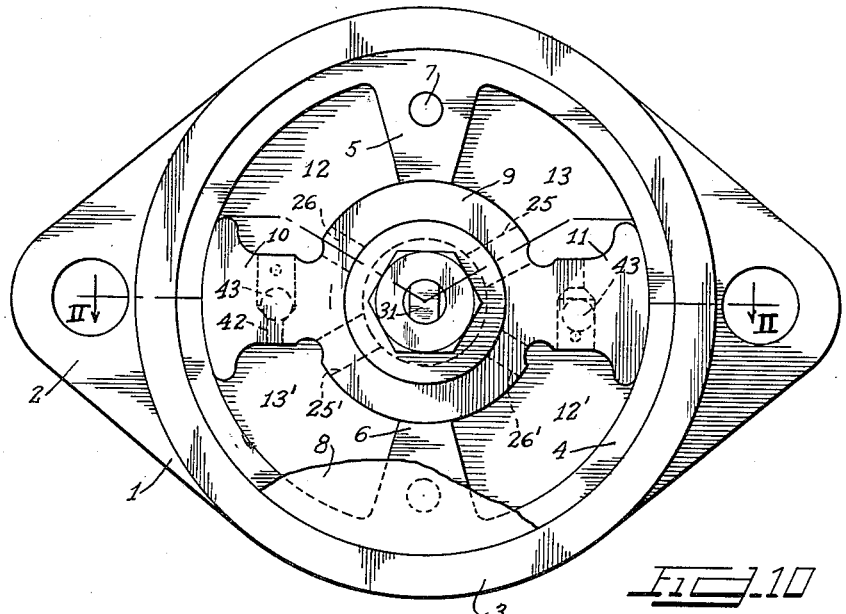
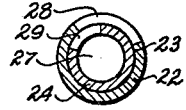
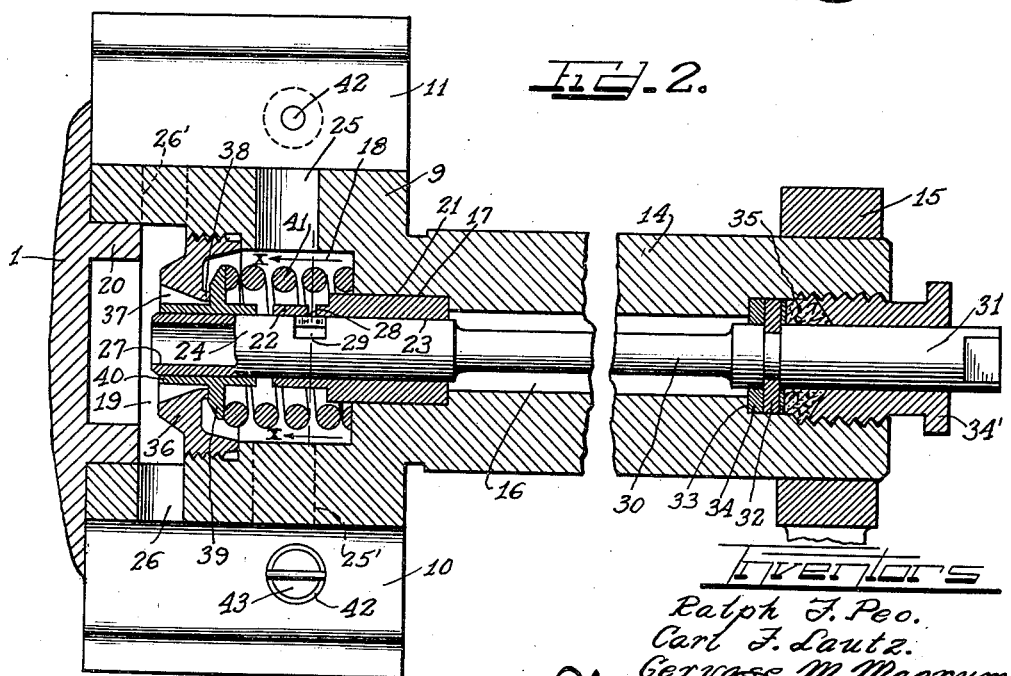
Inventors
Ralph F. Peo.
Carl F. Lautz.
Gervase M. Magrum.
by Charles Hall Attys.

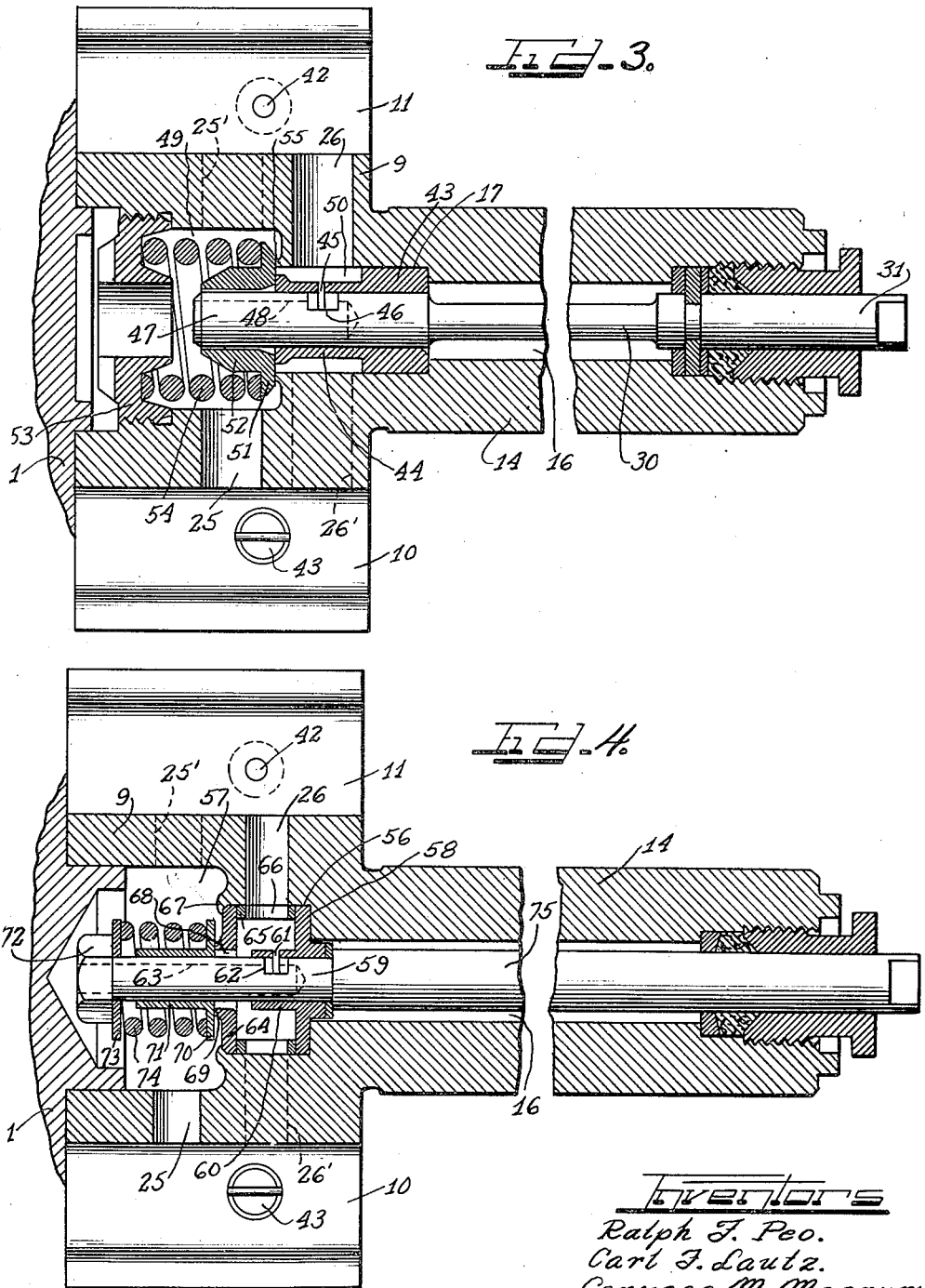

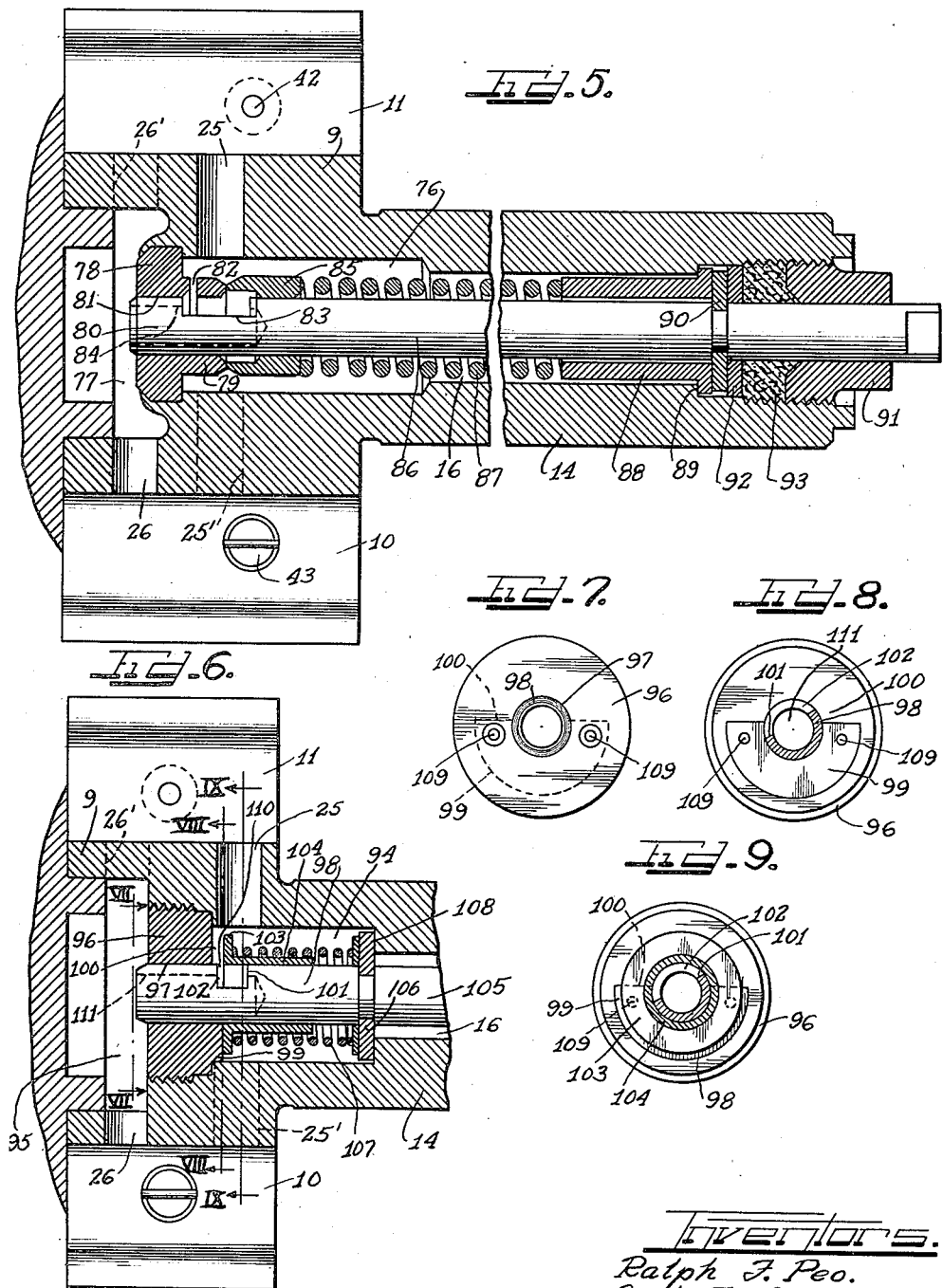

Patented Aug. 10, 1937

2,089,419

UNITED STATES PATENT OFFICE 2,089,419

VALVING ASSEMBLY FOR HYDRAULIC SHOCK ABSORBERS

Ralph F. Peo, Carl F. Lautz, and Gervase M. Magrum, Buffalo, N. Y., assignors to Houde Engineering Corporation, Buffalo, N. Y., a corporation of New York Application February 8, 1936, Serial No. 62,944

15 Claims. (Cl. 188—100)

This invention relates to valving assemblies adapted particularly for controlling the fluid flow in hydraulic shock absorbers applied to vehicles.

An important object of the invention is to provide improved valving assemblies in which a valve plug is manually rotatably adjustable for adjusting the size of a metering orifice for metering the displaced fluid flow during rebound operation of the vehicle spring with which the shock absorber is associated, together with a blow-off valve shiftable off its seat by abnormal fluid pressure against the resistance of a spring to provide additional passageway for the flow of fluid to relieve the excess pressure.

A further object of the invention is to provide a restricting metering orifice and arrangement which will tend to properly meter the flow under normal pressure conditions uninfluenced by variation in the viscosity of the fluid.

A further important object is to provide blow-off valve arrangement in which the blow-off valve, when in normal position, determines the size of the restricted orifice and which when moved by excess pressure will effect widening of the orifice for increased fluid flow.

The above enumerated and other features of the invention are incorporated in the structure disclosed on the drawings, in which drawings:

Figure 1 is a plan view of a hydraulic shock absorber to which we have shown our valving assembly applied, part of the shock absorber cover being removed;

Figure 2 is a section on plane II—II Figure 1 showing one form of valving assembly for the shock absorber;

Figures 3, 4, and 5 are views similar to Figure 2 showing modified forms of the valving assembly;

Figure 6 is a view similar to Figure 2 showing another modified form of the valving assembly;

Figure 7 is a view of the inner end of the valve seating member and the valve plug therein, looking from plane VII—VII Figure 6;

Figure 8 is a section on plane VIII—VIII Figure 6;

Figure 9 is a section on plane IX—IX Figure 6; and

Figure 10 is a section through the valve structure on plane X—X Figure 2.

The shock absorber to which we have shown the valving assemblies applied is of the so-called rotary type. Briefly describing the structure, it comprises a base 1 having ears 2 for securing it to a support as for example the chassis of an automobile. The annular wall 3 extends from the base and within this wall is the ring 4 from which extend the abutment partitions 5 and 6, this ring structure being secured by pins 7 extending through the abutment partitions and into the base 1. The outer end of the annular wall 3 is closed by a cover structure 8 which may be secured by threaded engagement with the wall 3.

Within the ring 4 is the cylindrical piston hub 9 which extends between the abutment partitions 5 and 6 and which has piston vanes 10 and 11 extending therefrom for bearing engagement with the ring, this piston structure together with the partition members dividing the space within the ring and between the base and cover structure 8 into high pressure chambers 12 and 12' and low pressure chambers 13 and 13' from which the oil is displaced as the piston structure oscillates.

A shaft 14 extends from the piston hub 9 and at its outer end is journaled in the cover structure in a well known manner, the shaft at its outer end having applied thereto a lever 15 (Figure 2) for connection usually with the axle of the vehicle so that during relative movement between the chassis and axle the piston structure will be oscillated for displacement of the hydraulic fluid.

Figure 2 shows one form of valving mechanism for use in the hydraulic shock absorber. The shaft 14 has the axial bore 16 extending therethrough which communicates at its inner end with a counter-bore 17, the hub 9 having an intermediate bore 18 of larger diameter and an end bore 19 of still larger diameter, the bore 19 receiving a bearing lug 20 extending from the base 1 so as to journal the piston structure at its inner end. Fitting into the counter-bore 17 is a valve seat member 21 which projects a distance into the intermediate bore or chamber 18 and has the annular neck 22. The seat member and its neck have the axial bore 23 for receiving the cylindrical valve plug 24.

The chamber 18 is connected by passages 25 and 25' with the low pressure working chambers 13 and 13' respectively of the shock absorber, while the bore or chamber 19 is connected by passages 26 and 26' with the high pressure working chambers 12 and 12' respectively of the shock absorber. The valve plug has an axial bore 27 extending thereinto from the inner end thereof where the bore communicates with the chamber 19 connected with the high pressure working chambers. The annular neck 22 of the seating member 21 is comparatively thin and has a slit 28 therethrough extending a distance circumferentially, and the valve plug is transversely cut or slotted to provide a port 29 extending longitudinally to span the slit 28 and extending a distance circumferentially for more or less circumferential overlap of the slit 28, the exposed slit then forming a short and narrow restricted orifice for metering the fluid flow as clearly shown in Figure 10.

The valve plug has a stem 30 extending therefrom through the shaft bore 16, the outer end of the stem terminating in a head 31 carrying near its inner end a collar 32 between which and the shoulder 33 a washer 34 is preferably interposed. A gland 34' receives the stem head 31 and has threaded engagement in the outer end of the shaft bore, packing 35 compressed by the gland against the collar 32 serving to firmly clamp the stem and valve structure against longitudinal or rotational displacement after the stem has been turned for the proper overlap of the valve port 29 and orifice slit 28 for the desired flow resistance.

Secured in the bottom of the bore or chamber 19, preferably by threading, is a seat plug 36 having the axial bore 37 which flares outwardly, an annular seating lip 38 extending inwardly from the plug around the inner end of the bore to form an annular valve seat. An annular valve 39 is adapted for engagement with the seat 38 and is located within the chamber 18 and is supported by its hub 40 which is supported by and is slidable on the inner end of the valve plug 24. Between the valve disc 39 and the bottom of the chamber 18 is interposed a compression spring 41 which tends to hold the valve 39 seated under ordinary pressure conditions but which yields to abnormal pressure conditions to permit unseating of the valve.

Describing the operation, the fluid displaced by the piston structure during rebound movement of the vehicle spring, flows from the high pressure chambers 12 and 12' through the passages 26, 26' into the chamber 19 and from there through the valve bore 27 and through the valve port 29 and exposed orifice slit 28 to the chamber 18 from where it flows by the passages 25 and 25' to the low pressure working chambers 13 and 13' of the shock absorber. Under normal pressure conditions all the displaced fluid will flow through the restricted orifice during rebound movement of the vehicle springs. Under such normal pressure conditions the spring 41 holds the blow-off valve 39 seated, but under abnormal pressure conditions the spring will yield to permit the excess pressure to unseat the valve 39 to open another path for fluid flow through the bore 37 and around the valve seat 38 of the seat member 36, the valve 39 remaining unseated for such additional flow until normal pressure conditions are resumed when the valve will again be reseated by the spring and the flow will again be entirely through the restricted orifice 28.

During compression movement of the vehicle spring less shock absorber resistance is required and therefore lower resistance passageway is provided for the fluid flow, which passageway may be in the form of passages 42 through the piston vane provided with check valves such as balls 43, the passageways being open for freer flow from the low pressure chambers to the high pressure chambers during compression movement of the vehicle spring but being closed by the check valve during rebound movement of the vehicle springs.

Figure 3 shows a modified arrangement of valving structure and assembly. The arrangement is substantially the same as that of Figure 2 except that the blow-off valve seats against the inner end of the seat member for the valve plug. The valve plug seat member 43 is within the counter-bore 17 of the shaft and has the neck 44 of reduced diameter provided with the orifice slit 45 which cooperates with the port 46 of the valve plug 47, which valve plug has the bore 48 communicating with the chamber 49 in the hub 9. The annular space 50 around the seat neck 44 communicates through passages 26 and 26' with the high pressure chambers 12 and 12' respectively of the shock absorber.

Within the chamber 49 is the blow-off valve disc 51 whose hub 52 is slidable on the inner end of the valve plug. The end of the chamber 49 is closed by a plug 53 between which and the valve disc the compression spring 54 is interposed. The spring tends to hold the valve disc seated against the inner end of the seating member neck 44 and also against an annular seating lip 55 formed at the bottom of the chamber 49. The chamber 49 is connected by passages 25 and 25' with the low pressure working chambers 13 and 13' respectively of the shock absorber.

The adjustment for the valve plug is substantially the same as that shown in Figure 2, the valve stem being manually rotatable from the exterior of the shock absorber for rotation of the valve plug for the proper degree of overlap of the valve port 26 and the orifice slit 45 for the desired degree of resistance to fluid flow. During rebound movement of the vehicle springs the fluid displaced from the high pressure working chambers will flow through passages 26 and 26' and through the restricted orifice and the bore of the valve plug and into chamber 49 and from there through passages 25 and 25' to the low pressure working chambers of the shock absorber. During normal pressure conditions all of the fluid flow will be through the restricted orifice, but under abnormal pressure conditions the spring 54 will yield for shift of the blow-off valve by the pressure away from its seat for providing an additional path between the unseated valve and its seat so that the excess pressure will be relieved.

Figure 4 shows another modified arrangement. The shaft bore 16 communicates with a larger bore 56 in the hub 9, the inner end of the hub having a still larger bore or chamber 57. The bore or chamber 56 is connected by passages 26 and 26' with the high pressure working chambers 12 and 12' of the shock absorber and the chamber 57 is connected by passages 25 and 25' with the low pressure working chambers 13 and 13'.

In the bottom of the chamber 56 is a seating member 58 for the valve plug 59, this seating member having the reduced neck 60 having the circumferentially extending orifice slit 61 for cooperating with the port 62 which communicates with the bore 63 in the valve plug.

In the outer end of the chamber 56 is a seating disc 64 between which and the seating member 58 is interposed a spacer bushing 65 which has passages 66 communicating with the passages 26 and 26'. The assembly including the seat member 58, the bushing 65, and the seated disc 64 is securely held within the chamber 56 as by deflecting over against the back of the disc 64 the metal around the outlet edge of the chamber 56, as indicated at 67. The seated disc 64 has an axial passage of larger diameter than the valve plug to leave an annular space 68 which is surrounded by the annular seating lip 69 on the outer side of the disc. A blow-off valve comprises the disc 70, whose hub 71 is seated on the valve plug for sliding movement thereon. An abutment such as a nut 72 is secured to the end of the valve plug and a washer 73 abuts the nut, and between this washer and the valve disc 70 is interposed a compression spring 74 which tends to hold the valve disc 70 seated against the seat 69.

During rebound movement of the vehicle spring the fluid displaced from the high pressure working chambers of the shock absorber will flow through the passages 26 and 26' and through the restricted orifice 61 into the valve bore, then from chamber 57 through passages 25 and 25' to the low pressure working chambers of the shock absorber. During normal pressure conditions the valve disc 70 is seated by the spring 74, but under abnormal pressure conditions the spring will yield for unseating of the valve disc and the opening of an additional path by way of the space between the seat member 64 and the unseated valve, so that excess pressure will be relieved. The stem 75 for the valve plug 59 extends to the exterior of the shock absorber for manual rotation for setting of the desired overlap of the valve port and the restricted orifice.

In the modified arrangement shown in Figure 5, the valve bore 16 communicates with the intermediate chamber 76 in the head 9, this chamber being connected by passages 25 and 25' with the low pressure working chambers of the shock absorber. The chamber 77 in the inner end of the hub 9 is connected by passages 26 and 26' with the high pressure working chambers of the shock absorber. Between the chambers 76 and 77 is interposed the seat member 78 having the reduced neck 79 extending into chamber 76, the valve plug 80 extending through the bore 81 of the seat member and neck 79. The neck 79 has a narrow circumferentially extending orifice slit 82 for cooperating with the valve port 83 which communicates with the bore 84 in the valve plug.

Within the chamber 76 is the blow-off valve 85 in the form of a sleeve slidable on the valve stem 86, the adjacent end of the seating member neck 79 forming a seat for this blow-off valve, the valve port 83 extending inwardly a distance beyond the seating zone of the blow-off valve.

The blow-off valve is normally held to its seat by a spring 87 encircling the valve stem and abutted by a sleeve 88 secured in the end of the shaft 14. As shown, the outer end of the sleeve rests against a shoulder 89 on the shaft 14 and is abutted by a collar 90 of the stem. A gland 91 surrounds the outer end of the stem and has threaded engagement in the end of the bore 16 for holding a washer 92 against the collar 90 by interposed packing material 93.

During rebound movement of the vehicle springs the displaced hydraulic fluid flows from the high pressure working chambers of the shock absorber through passages 26 and 26' into chamber 77 and from there through the valve plug bore and through the valve port and the restricted orifice and through passages 25 and 25' to the low pressure working chambers. During normal pressure conditions the spring 87 will hold the blow-off valve 85 seated, but under abnormal pressure conditions the spring yields and the pressure unseats the blow-off valve to provide another passageway for fluid flow for relieving the excess pressure.

In the modified arrangement of Figures 6, 7, 8 and 9 the shaft bore 16 communicates with the valve chamber 94 which is connected by passages 25 and 25' with the low pressure working chambers of the shock absorber. The chamber 95 in the end of the piston hub 9 is connected by passages 26 and 26' with the high pressure chambers. Between the chambers 94 and 95 is interposed the seat member 96 which has the bore 97 therethrough for the valve plug 98. The inner side of the seat member 96 has the cylindrical projection 99 of reduced diameter extending into the chamber 94. This projection is cut away at one side of the center line to leave the segmental shaped passage 100. The valve plug is transversely notched to provide the port 101 which communicates with the seating member segmental passage 100, the degree of communication being determined by the degree of overlap of the valve port and passage (Fig. 8).

The extension 99 forms a seat for the blow-off valve disc 103 which is mounted by its sleeve 104 on the valve plug to slide thereon. Between the valve plug and the valve stem 105 is an abutment collar 106 between which and the valve disc is interposed a compression spring 107 which tends to hold the blow-off valve seated, the shoulder 108 forming a backing for the abutment collar.

As shown in Figures 7, 8 and 9, the seating member 96 has fluid passageways 109 extending therethrough and through its extension 99, the passageways being normally covered and closed by the blow-off valve disc 103.

The inner face 102 of the valve port 101 is in a diametral plane outside of the bottom plane of the segmental channel 100 and a short distance inwardly of the seating plane of the blow-off valve 103 on the extension 99 so that when the blow-off valve is in its normal seating position, its inner edge cooperates with the adjacent edge of the face 102 of the valve plug port to define the orifice slit 110 whose circumferential extent depends upon the degree of overlap of the valve port and the segmental passage 100 in the seat member. During rebound movement of the vehicle springs, and under normal pressure conditions, the displaced fluid flow will be from the high pressure hydraulic working chambers through passages 26 and 26' into the chamber 95 and then through the bore 111 of the valve plug and the restricted orifice slit 110 and through passages 25 and 25' to the low pressure working chambers. During such normal pressure conditions the spring will hold the blow-off valve seated so that the passages 109 will be closed to fluid flow. However, under abnormal pressure conditions, the spring will yield and the blow-off valve will be shifted to expose the passages 109 for fluid flow, and movement of the blow-off valve will also cause widening of the orifice slit 110 for increased flow therethrough. The blow-off valve remains unseated until the excess pressure has been relieved when it will again be held seated by the spring.

We thus provide improved, simplified and efficient valving assembly for hydraulic shock absorbers in which assembly a valve plug is rotatably adjustable manually for circumferential overlap of its port and a circumferentially extending orifice slit for the desired resistance to fluid flow during rebound movement of the vehicle springs, a blow-off valve structure being responsive to abnormal or excessive pressure to be moved by the pressure to provide additional fluid passageways for relieving the excess pressure.

We have shown practical and efficient embodiments of the various features of our invention but we do not desire to limit it to the exact construction, arrangement and operation shown and described as changes and modifications may be made which will still come within the scope of the invention.

We claim as follows:

1. A valving assembly for controlling the displaced fluid flow in a hydraulic shock absorber, comprising a stationary seat member having a bore and a cylindrical valve plug rotatable in said bore, said seat member having a circumferentially extending slit and said valve having a circumferentially extending port, means adapting said valve plug for manual rotation for adjusting the overlap of said slit by said port for defining a restricted orifice, an annular valve seat surrounding said valve plug, a blow-off valve slidable on said valve plug, and a spring for yieldingly holding said blow-off valve against said annular seating member, means defining a fluid flow path through said valve plug including said orifice, and means defining a second fluid path when said blow-off valve is unseated.

2. A valve assembly for controlling the displaced hydraulic fluid flow in a hydraulic shock absorber, comprising a first seat member having a cylindrical bore, a cylindrical valve plug extending through and seated in said bore, said seat member and valve plug having circumferentially extending ports, means for manually rotatably adjusting said valve plug for overlap of said ports to define a restricted orifice, a second seat member concentric with said first seat member, a blow-off valve concentric with said seat member and a spring normally holding said blow-off valve seated on said second seat member, means defining a fluid flow passageway through said valve plug including said orifice, and means defining a second path in parallel with said orifice path when said blow-off valve is unseated.

3. A valving assembly for controlling the hydraulic fluid flow in a hydraulic shock absorber, comprising a seat member having a cylindrical bore, a cylindrical valve plug extending through said bore, said seat member and valve plug having circumferentially extending ports, means adapting said valve plug for rotatable adjustment for overlap of said ports to define a restricted orifice, an annular seat concentric with said valve plug, a blow-off valve slidable on said valve plug to cooperate with said seat, a spring yieldably holding said blow-off valve seated, means defining a fluid path through said valve plug including said orifice, and means defining a second fluid flow path in parallel with the orifice path when said blow-off valve is unseated.

4. A valving assembly for controlling the fluid flow in a hydraulic shock absorber, comprising a seat member having a bore therethrough, a cylindrical valve plug extending through said bore, said seat member having a circumferentially extending radially short slit and said valve having a circumferentially extending port, said valve plug being adapted for manual rotary adjustment for overlap of said slit by said port to define a restricted orifice, an annular valve seat adjacent to and concentric with said valve plug, a blow-off valve movable on said valve plug for cooperation with said annular valve seat and a spring yieldably holding said blow-off valve seated, means defining a fluid flow path through said valve plug including said orifice, and means defining a second fluid path parallel with the orifice path when said blow-off valve is unseated.

5. A valving assembly for controlling the displaced fluid flow in a hydraulic shock absorber, comprising a cylindrical seat member having an axially extending bore therethrough, a cylindrical valve plug extending through said bore, a portion of said seat member being of reduced diameter to leave a radially thin wall surrounding said bore, a narrow circumferentially extending slit through said reduced portion and a port for said valve plug registering with said slit, said valve plug being arranged for manual rotary adjustment for setting the overlap by said slit of said port to define a restricted orifice, means providing an annular seat surrounding said valve plug, a blow-off valve movable on said valve plug for cooperation with said annular seat, a spring yieldably holding said blow-off valve seated, means defining a fluid flow path through said valve plug including said orifice, and means defining a second fluid path in parallel with the orifice path when said blow-off valve is unseated.

6. A valving assembly for controlling the fluid flow in a hydraulic shock absorber, comprising a seat member having a cylindrical bore therethrough, a cylindrical valve extending through said bore, said seat member and said valve having circumferentially extending ports, means whereby said valve may be manually rotatably adjusted for overlap of said ports to define a restricted orifice, an annular valve seat surrounding said valve, a blow-off valve slidable on said cylindrical valve for cooperation with said annular seat, an abutment on said valve, a spring between said abutment and said blow-off valve for yieldably holding said blow-off valve seated, means defining a fluid flow path through said cylindrical valve including said orifice, and means defining a second fluid flow path in parallel with said orifice path when said blow-off valve is unseated.

7. A valving assembly for controlling the flow of hydraulic fluid in a hydraulic shock absorber, comprising a seat member having a cylindrical bore therethrough, a cylindrical valve extending through said bore, said seat member and bore having circumferentially extending ports, means adapting said valve for rotary manual adjustment for overlap of said ports to define a restricted orifice, one end of said seat member being formed to provide an annular valve seat, a blow-off valve slidable on said cylindrical valve for cooperation with said seat, a spring tending to hold said blow-off valve seated, means defining a fluid flow path through said cylindrical valve including said orifice, and means defining a second fluid flow path in parallel with the orifice path when said blow-off valve is unseated.

8. A valving assembly for controlling the fluid flow in a hydraulic shock absorber, comprising a seat member having a cylindrical bore therethrough, a cylindrical valve plug seated in said bore, a narrow circumferentially extending passage at one end of said seating member, said valve plug having a circumferentially extending port registering with said seat member passage, a blow-off valve movable on said valve plug and forming the outer wall of said seat member passage, a spring yieldably holding said blow-off valve seated against said seat member, said valve plug being adapted for manual rotatable setting for adjustment of the circumferential overlap by its port of said seat member passage, the side of said valve port and said blow-off valve being normally set to form a narrow space whereby to provide a restricted orifice, fluid flow passageways longitudinally through said seat member normally closed by said blow-off valve, means defining a fluid flow path through said valve plug including said restricted orifice, and a second fluid flow path being provided through said seat member passageways in parallel with said orifice path when said blow-off valve is unseated, unseating of said blow-off valve causing increase in width of said orifice for increased fluid flow through said orifice path.

9. A valving assembly for controlling the fluid flow in a hydraulic shock absorber, comprising a seat member having a cylindrical bore therethrough and having at one end a narrow channel extending a distance circumferentially around said bore, a cylindrical valve plug in said bore, a blow-off valve slidable on said valve plug to seat against said seat member and forming the outer wall of said channel, a spring tending to hold said blow-off valve seated, said valve plug having a port in registration with said channel, an edge of said valve plug and the inner edge of said blow-off valve defining a restricted orifice, said seat member having ports therethrough closed by said blow-off valve when seated, means defining a fluid flow path through said valve plug and including said restricted orifice, said seat member ports being included in a second fluid path in parallel with said orifice path when said blow-off valve is unseated, unseating movement of said blow-off valve causing widening of said restricted orifice for increased flow therethrough.

10. A valving assembly for controlling the fluid flow in a hydraulic shock absorber comprising a valve member having a port, a blow-off valve slidable on said valve member, a seat member for said blow-off valve, spring means normally holding said blow-off valve against said seat member with one end of the blow-off valve spaced from one end of said port to provide a restricted orifice for fluid flow, said spring means yielding under abnormal fluid pressure against said blow-off valve for movement of said blow-off valve for increasing the size of said orifice for freer flow therethrough.

11. A valving assembly for controlling the fluid flow in a hydraulic shock absorber comprising a valve member having a port, a blow-off valve slidable on said valve member, a seat member for said blow-off valve, spring means normally holding said blow-off valve against said seat member with one end of the blow-off valve spaced from one end of said port to provide a restricted orifice for fluid flow, said spring means yielding under abnormal fluid pressure against said blow-off valve for movement of said blow-off valve for increasing the size of said orifice for freer flow therethrough, and auxiliary flow passageway through said seat member normally closed by said blow-off valve.

12. A valving assembly for controlling the fluid flow in a hydraulic shock absorber comprising a seat member, a support extending from said seat member, said support having a fluid flow passageway therethrough and a port, a valve slidable on said support to seat against said seat member, the end of said valve and the adjacent end of said port defining a restricted orifice when said valve is seated, spring means holding said valve seated under normal fluid pressure conditions whereby said restricted orifice will meter the flow but yielding under abnormal pressure conditions for movement of the valve to increase the size of said orifice for freer flow therethrough.

13. A valving assembly for controlling the fluid flow in a hydraulic shock absorber, comprising a seat member, a valve for seating against one side of said seat member and a spring tending to hold said valve seated, said seat member having a passageway therethrough for flow of fluid under pressure against said valve tending to unseat the valve, a fluid flow path in shunt of said seat member passageway including an orifice controlled and restricted by said valve when said valve is seated, said spring means yielding under abnormal pressure against said valve for movement of said valve to increase the size of said orifice.

14. A valving assembly for controlling the fluid flow in a hydraulic shock absorber comprising a seat member and a valve plug supported thereby, a blow-off valve slidable on said valve plug to seat against said seat member, a spring tending to hold said blow-off valve seated, said valve plug having a port and one end of said port and the adjacent end of said blow-off valve defining a restricted orifice when the blow-off valve is seated, unseating movement of said blow-off valve causing widening of said restricted orifice for increased flow therethrough.

15. A valving assembly for controlling the fluid flow in a hydraulic shock absorber comprising a seat member and a valve plug supported thereby, a blow-off valve slidable on said valve plug to seat against said seat member, a spring tending to hold said blow-off valve seated, said valve plug having a port and one end of said port and the adjacent end of said blow-off valve defining a restricted orifice when the blow-off valve is seated, unseating movement of said blow-off valve causing widening of said restricted orifice for increased flow therethrough, said valve plug being manually rotatable for adjustment of the length of said orifice.

RALPH F. PEO.
CARL F. LAUTZ.
GERVASE M. MAGRUM.